(12) United States Patent
Hekmatpour

(10) Patent No.: US 7,483,913 B2
(45) Date of Patent: Jan. 27, 2009

(54) XML-BASED SYSTEM AND METHOD FOR COLLABORATIVE WEB-BASED DESIGN AND VERIFICATION OF SYSTEM-ON-A-CHIP

(75) Inventor: Amir Hekmatpour, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 11/222,337

(22) Filed: Sep. 8, 2005

(65) Prior Publication Data

US 2006/0041582 A1 Feb. 23, 2006

Related U.S. Application Data

(63) Continuation of application No. 09/840,421, filed on Apr. 23, 2001, now Pat. No. 6,968,346.

(51) Int. Cl.
*G06F 7/00* (2006.01)
*G06F 17/50* (2006.01)
(52) U.S. Cl. .......................................... 707/102; 716/1
(58) Field of Classification Search ................. 707/102; 716/1
See application file for complete search history.

(56) References Cited

U.S. PATENT DOCUMENTS

| | | | |
|---|---|---|---|
| 5,644,768 A | 7/1997 | Periwal et al. |
| 5,822,585 A | 10/1998 | Noble et al. |
| 6,012,098 A | 1/2000 | Bayeh et al. |
| 6,012,984 A | 1/2000 | Roseman |
| 6,018,716 A | 1/2000 | Denardo |
| 6,028,605 A | 2/2000 | Conrad |
| 6,038,566 A | 3/2000 | Tsai |
| 6,038,668 A | 3/2000 | Chipman et al. |

OTHER PUBLICATIONS

"Distributed Collaborative design and Manufacturability Assessment for Extended Enterprise in XML-based Agent system", copyright 2000 IEEE, Shiau et al.*
"WebSplitter: A Unified XML Framework for Multi-Device Collaborative Web Browsing", Copyright 2000 ACM, Richard Han et al.*
Schindler, Peter, "IP Repository, a Web based IP Reuse Infrastructure," IEEE 1999 Custom Integrated Circuits Conference, May 1999, pp. 415-418.
Truzzi, Claudio, "The Role of the Good-Die Project in Miniaturized-System Design," IEEE Design & Test of Computers, Jul.-Sep. 1998, vol. 15, Issue 3, pp. 35-43.

* cited by examiner

*Primary Examiner*—Apu Mofiz
*Assistant Examiner*—Cindy Nguyen
(74) *Attorney, Agent, or Firm*—Josh G. Cockburn; Dillon & Yudell LLP

(57) ABSTRACT

A computer-based design framework for collaborative design of a product by distributed design team members. The design framework comprises: a virtual database management system, which receives data from a plurality of distinct sources and creates a single relational database interface to each of the distinct sources; software code associated with the virtual database management system for mapping various informational structures utilized by the distinct sources to a common XML syntax; and additional logic associated with the virtual database management system that provides publishing rules for extracting information on demand and publishing the extracted information in a format recognized by a requestor of the information. When the product is a system on a chip (SOC) a special set of functions are generated that enable platform-independent application and services exchange utilizing XML wrapped data, service, and applications.

6 Claims, 11 Drawing Sheets

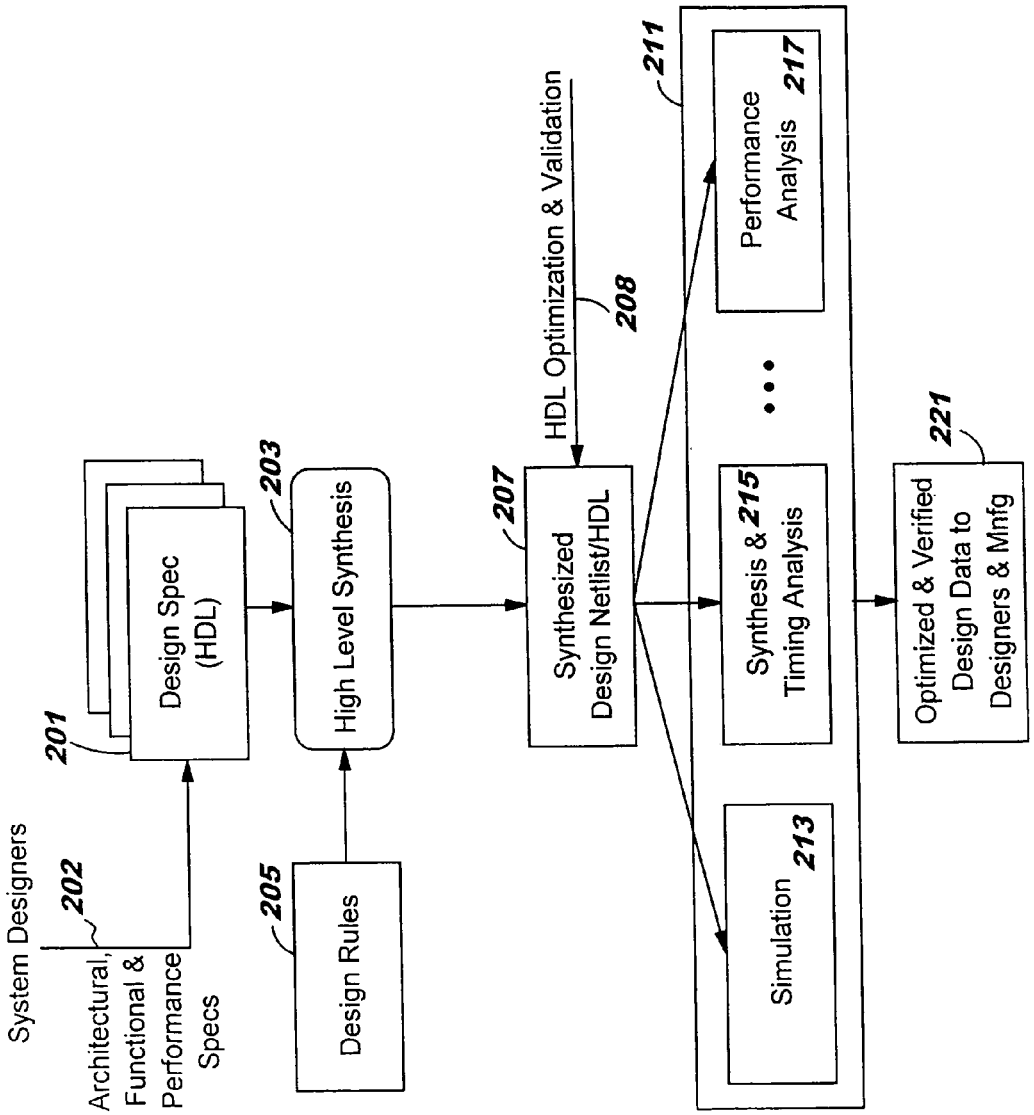

XML-BASED SYSTEM AND METHOD FOR COLLABORATIVE WEB-BASED DESIGN AND VERIFICATION OF SYSTEM-ON-A-CHIP

This a continuation of prior U.S patent application Ser. No. 09/840,421, filed on Apr. 23, 2001 now U.S. Pat. No. 6,968,346, entitled "XML-BASED SYSTEM AND METHOD FOR COLLABORATIVE WEB-BASED DESIGN AND VERIFICATION OF SYSTEM-ON-A-CHIP.

BACKGROUND OF THE INVENTION

1. Technical Field

The present invention relates in general to system-on-a-chip (SoC) and in particular to the design of SoCs. Still more particularly, the present invention relates to a method, system and program product for collaborative web-based design of SoCs and integrated circuits.

2. Description of the Related Art

Technological improvements in integrated circuits (IC), particularly the advent of deep-submicron process technology, have led to the development of the system-on-a-chip (SoC), by which a complete, fully functional system is designed and integrated on a single silicon chip. Because of the large and increasing number of components (e.g., gates) that are becoming available, the application-specific integrated circuit (ASIC) designer is often unable to take full advantage of the technical potential for system integration, performance gains, and system cost savings. On the other hand the number of gates available in a SoC and number of Intellectual property cores ("IPs") available to designers are growing at a much faster rate than the designer's ability to assimilate, and to be able to take full advantage in the current design environments.

Typically, with a majority of SoC design projects, the design expertise and associated CAD tools may be in different corporate locations and, in many cases, across multiple corporations. Finding all the skilled candidates to complete specific design tasks in a single geographical location is often impossible, and it is common for the various design teams to be located in different states, or even in different countries. As a result, collaboration around the traditional white board within a single location has been replaced by remote telecommuting among design teams, and completing design projects with such a geographically dispersed design teams, is quickly becoming commonplace.

Because of the need for collaborative efforts between the various design teams in designing a SoC, SoC development is very difficult when these various design teams are separated by geographic locations and time zones, face language and cultural barriers, and share different design quality standards. In many cases, there are major differences between the customer design team, which is familiar with and drives the system functions and requirements, and the foundry team (such as, e.g., IBM, Intel, Motorola, and DEC), who provides the development expertise, the manufacturing technology know-how, and DA tools and services (such as cadence, synopsis, cardtools, etc.).

Additional complexity is added to the design process because each design team may be working on a different platform (i.e., hardware and operating system (OS)) and generating proprietary design specification files. Due to continued pressure to decrease the design cycle and Time-To-Market (because of the need to keep ahead of competitors and to keep up with the pace of technological improvements), it is not usually possible for all parties to converge to one set of tools and standards. Further, in many cases, the customer design team may not want to completely adopt the foundry design team's tool set, standards and methodology since the customer design team's next design project may be more suitable for a different foundry with a different tool set and set of standards. In addition, it is both costly and time consuming for customer design teams to train their personnel and to optimize and verify new design processes for each new design project. Cost associated with acquiring a new set of tools and expertise is another inhibitor to adopting traditional design methodologies (i.e., fully adopting foundry compatible design methodology).

As SoC designs become more challenging, many companies will choose to out-source pieces of the design task, such as IP design and optimization, synthesis and timing, physical design, and manufacturing. This out sourcing helps to cut development costs. However, outsourcing means that design teams have to share (i.e., collaborate) information, designs, libraries, and even design-automation tools amongst themselves. Unfortunately, because of the globalized location of today's design teams, this collaboration is not an easy task with the traditional communication method (e.g., phone, fax, email, mail, or express mail). Relocating each group of a design team to a single location is also impractical and extremely costly (i.e., airfare, accommodations, equipment/tool purchase, etc).

There are several prior art systems which provide methods for sharing resources in a multi-user environment and organizing and working with networked data, etc. For example: U.S. Pat. No. 5,644,768 provides a concurrent data access in a database management systems environment; U.S. Pat. No. 6,018,716 provides a group consensus environment where all participants are working on the same problem, and U.S. Pat. No. 5,822,585 describes an object-oriented framework to build cooperative objects, which are then utilized to build distributed or cooperative applications.

None of the prior art methods, however, provide a solution for efficiently designing a SoC when the design teams are geographically dispersed and are utilizing different tools, standards, and formats, etc. The present invention thus recognizes that it would be both advantageous and desirable to provide a method, system, and program product for enabling collaborative design and verification of SoCs by geographically dispersed design teams. A method, system, and program product that permits such collaborative design and verification of SoC from separate design team specific applications and tools utilizing the Internet and XML functionality would be a welcomed improvement. These and other benefits are provided in the present invention.

SUMMARY OF THE INVENTION

A computer-based design framework for collaborative design of a product by distributed design team members is described. The design framework comprises: a virtual database management system, which receives data from a plurality of distinct sources and creates a single database interface to each of the distinct sources; software code associated with the virtual database management system for mapping various informational structures utilized by the distinct sources to a common syntax; and additional logic associated with the virtual database management system that provides publishing rules for extracting information on demand and publishing the extracted information in a format recognized by a requestor of the information.

Each of the distinct sources represents a design team or design team member that is provided access to the virtual database management system via a network. The design framework is generated utilizing an eXtensible Markup Language (XML). In the preferred embodiment, the design framework is generated for production/design of a system on a chip (SOC) and the XML is expanded with SOC-specific document type definitions to generate a plurality of functional components having SOC markup language (SOCML) features that operate according to SOCML design specification. The function components include a SOCML database, a SOCML simulator, a SOCML synthesis and timing analysis component, and a SOCML database exchange manager. The XML acts as a platform-independent wrapper for the SOCML functions.

Output from the design process is published utilizing transformation rules based on Extensible style sheet language (XSL) and is provided to design team members and other personnel, including clients, via XSL style sheets and XSLT transformers, which manipulate data from said SOCML database. Further output to clients/customers are generated with a platform independent application and services exchange including a universal description discovery and integration (UDDI) director for locating services and a simple object access protocol (SOAP) for exchange and export of data and services.

In one embodiment, the network is a local area network and connection to the framework by each of the design team members is provided via a LAN-connected terminal. In another embodiment, the network is the Internet and the virtual database management system is housed on a server on the Internet. Access to the design framework is provided via a web browser of a computer system that is connected to the Internet. An Access_Privilege_Manager is implemented with program code and monitors and controls access to the design framework by design teams, design team members, and other selected personnel and groups.

The Access_Privilege_Manager maintains a control list of one or more of authorization parameters from among users, user identification and passwords, a level of authorization for each user and group, a group to which each user belongs, specific group authority for access, and access authorization for one or more project administrators. Each user profile includes an associated role, wherein access to processes and designs within said framework is only granted to a user whose profile supports said access. In one embodiment, the Access_Privilege_Manager supports biometric security features for user-access to said framework.

The design framework also comprises a customer help at terminal (CHATSOC) component that provides an online video forum for conferencing between design teams, design team members and other personnel. CHATSOC includes a design forum, chat rooms, and design team rooms. CHATSOC allows a design team and design team member to obtain outside assistance. The outside assistance is selected from a compiled database of outside assistance personnel in response to a request for assistance by the design team or design team member, and a peer-to-peer connection is dynamically established when an outside assistance personnel accepts and acknowledges the request.

The design framework provides each design team with local ownership of a particular task within the design, and the local ownership allows the team to determine its level of corporation with other design teams and the level of information sharing allowed.

The design task is divided into a plurality of tasks and the design framework tracks each of the plurality of tasks and tools available within the design environment and assigns processing-intensive tasks to fastest processors and applications available in the design environment.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a high-level block diagram of a typical current existing SoC design methodology with manual optimization and syntax and style checking features;

DETAILED DESCRIPTION OF THE PREFERRED EMBODIMENT

The present invention provides an XML-based system, method and program product for collaborative web-based design and verification of System-On-a-Chip (SoC). Specifically, the invention allows the sharing of design data from a SoC among various design tools and applications. The invention is implemented utilizing a mechanism for data conversion and analysis among various design tools. The invention provides a secured, collaborative and distributed environment that schedules design tasks and provides control, while enforcing any access authorization and security requirements beyond the generic web protocols. In the preferred embodiment, the access authorization and security is enabled via an Access_Privilege_Manager, by which designers and their privileges and other design security issues are defined and managed. Features implemented with the invention allows changing the content of a SoC design database from one format to another.

Figure 1A:
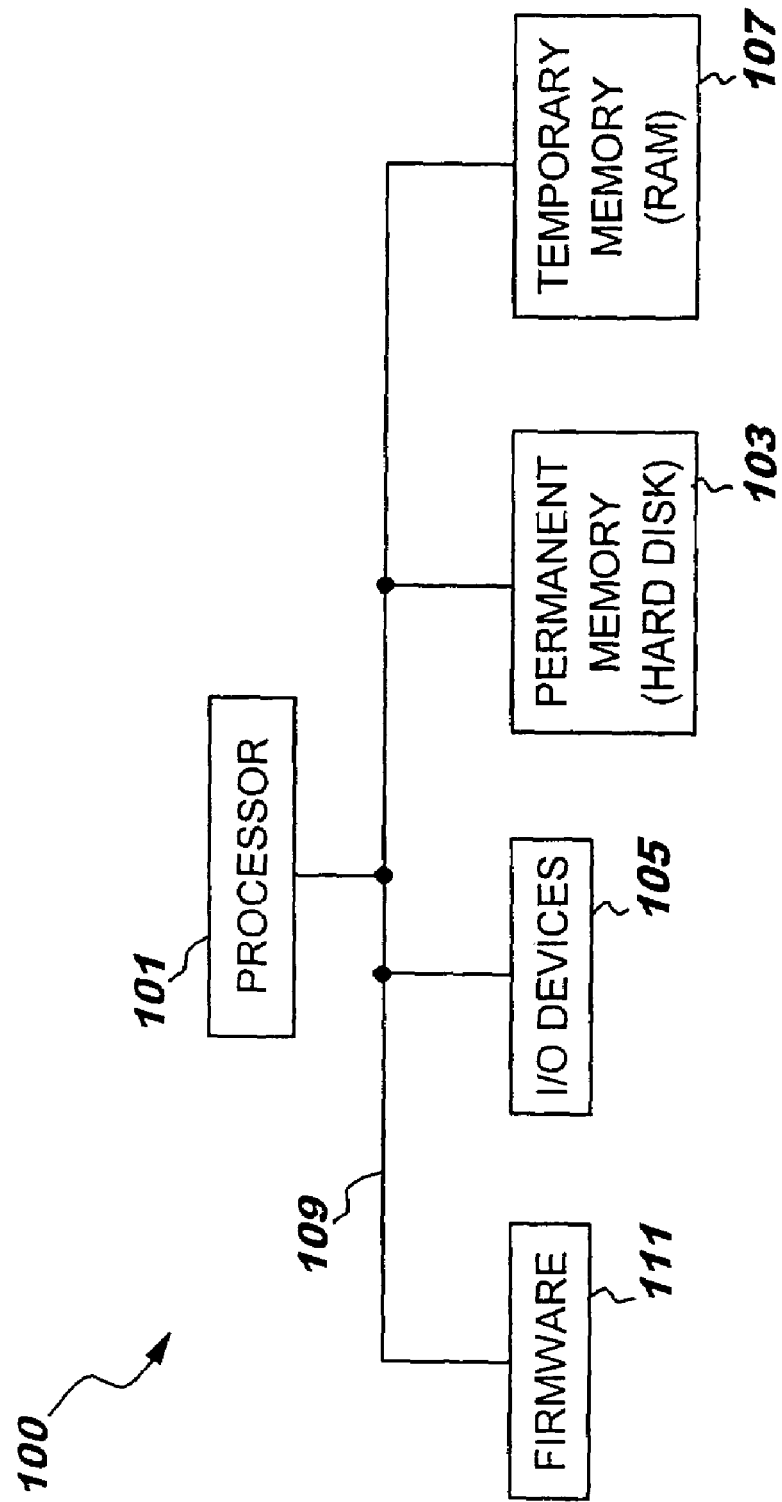
FIG. 1A depicts a data processing system by which features of the present invention may preferably be implemented.

With reference now to the figures and in particular with reference to FIG. 1, there is illustrated a high level block diagram of the major component parts of a data processing system that may be utilized to implement the various features of the present invention. Data processing system 100 comprises a Central Processing Unit (CPU) 101. CPU 101 is coupled to system memory 103, peripheral input/output (I/O) devices 105, firmware 111, and temporary memory 107 via interconnect 109. Stored within memory devices are the operating system (OS) and software code or logic by which many of the processes of the invention may be implemented, as will become clear later. When utilized to access a network, data processing system 100 includes a web browser within the software code or logic. When utilized as a server that provides the functionality of a design framework, however, data processing system 100 comprises a database of design information and a database of security access information and XML files to provide the various functional features of the invention described below. During operation, the software code or logic is executed by CPU 101 in system memory 103. Design team members and administrators may interface with data processing system 100 via I/O devices 105.

Among the I/O devices 105 connected to the CPU 101 may be keyboard, mouse, CD ROM, display monitor, and voice activated input/output devices. A display monitor provides a graphical user interface (GUI), which allows a user (or team member) to view and interact with the SoC design data and other related software applications stored in system memory or provided via a network.

Figure 1B:
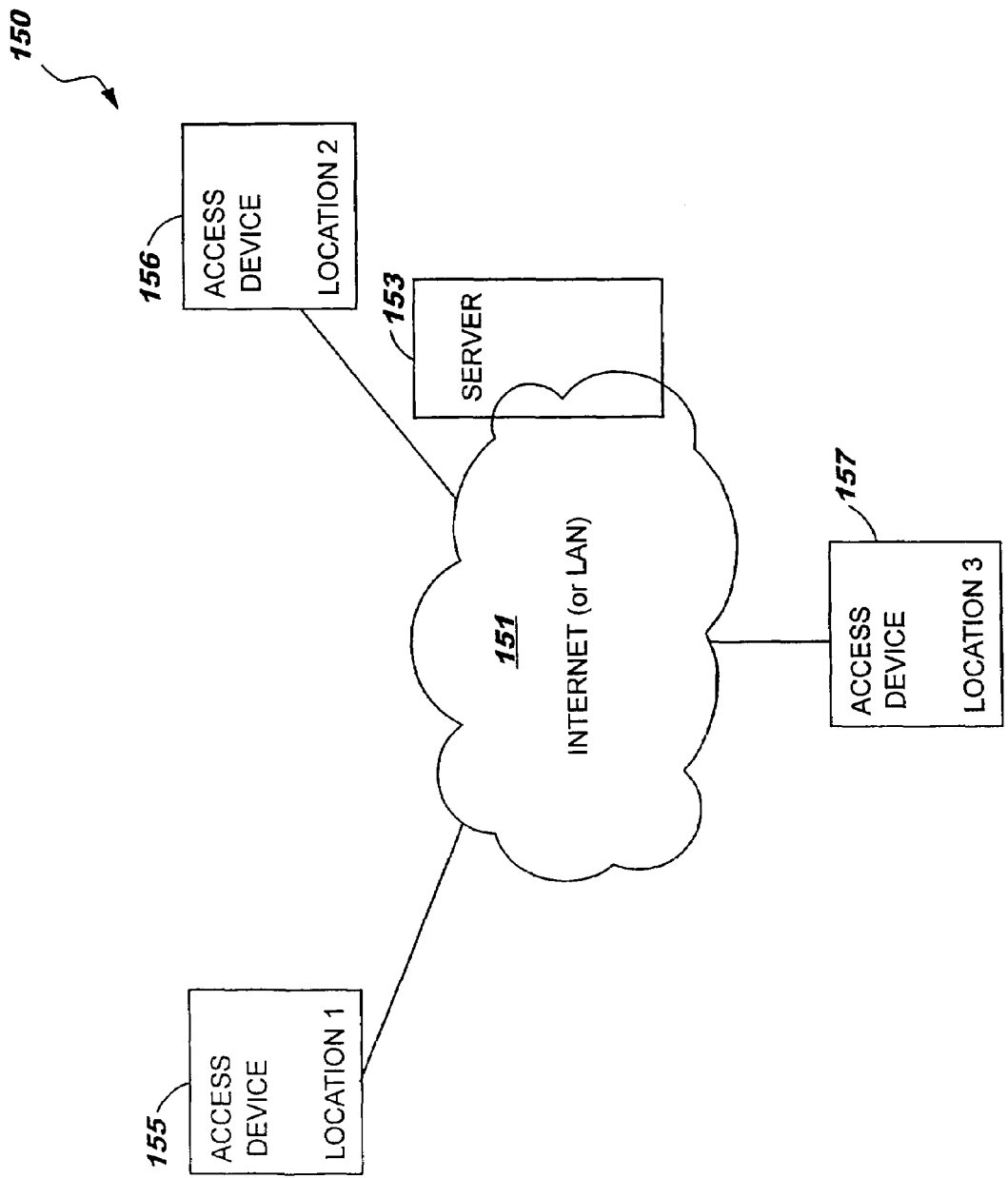
FIG. 1B depicts a high level representation of a network comprising the data processing system of FIG. 1A within which one embodiment of the present invention may preferably be implemented.

Also coupled to CPU 101 are various other devices/components (not shown). These other devices may include a modem and/or a network adapter utilized to connect data processing system 100 to other systems and/or networks, as is illustrated in FIG. 1B. In one embodiment a modem or network adapter may be utilized to connect data processing system 100 to a local area network (LAN). In yet another embodiment, the modem or network adapter is utilized to connect data processing system 100 to a Wide Area Network (WAN), including the Internet, as depicted in FIG. 1B.

Referring now to FIG. 1B, there is illustrated a high-level block diagram of a network 150 with geographically dispersed devices for accessing a design framework on which the XML-based features of the invention may be implemented. The network 150 consists of at least one server 153 and two or more access devices 155-157, corresponding to different design groups or teams. In the preferred embodiment, server 153 includes the XML-based management software and other components necessary to provide both the collaborative features and security features of the invention, as described further below. In another embodiment described with reference to FIG. 7 below, the various features are distributed amongst the devices attached to each other and the resulting architecture provides a distributed computer environment.

As illustrated, access devices 155-157 are connected to server 153 via the amorphous network 151 and each include software for accessing the network (e.g., web browser for accessing the Internet and the specific web site of the design framework).

Referring now to FIG. 2, there is illustrated a block diagram representation of an existing (universal) SoC design methodology. The blocks represent components or stages of the design process. System designers provide architectural, functional and performance specifications 202 in the form of design specification 201 in hardware description language (HDL). Then, design rules 205 are provided, and the design specification 201 taken through high level synthesis 203. The result of the synthesis 207 is optionally taken through an HDL optimization and verification process manually 208. The synthesis 207 provides design specification in Netlist or HDL to the next level of design, verification and optimization 211, including simulation 213, synthesis and timing analysis 215, and performance analysis 217. Following these various processes, the design step proceeds to create optimized and verified design data to the designers and manufacturers 221 to manufacture the SoC. Notably, in this design methodology, optimization and syntax and style checking can be performed and each design stage is performed independent of the other design stages. Most design stages are performed sequentially in the same local design shop, using pre-defined and locally available design tools and services.

Figure 3:
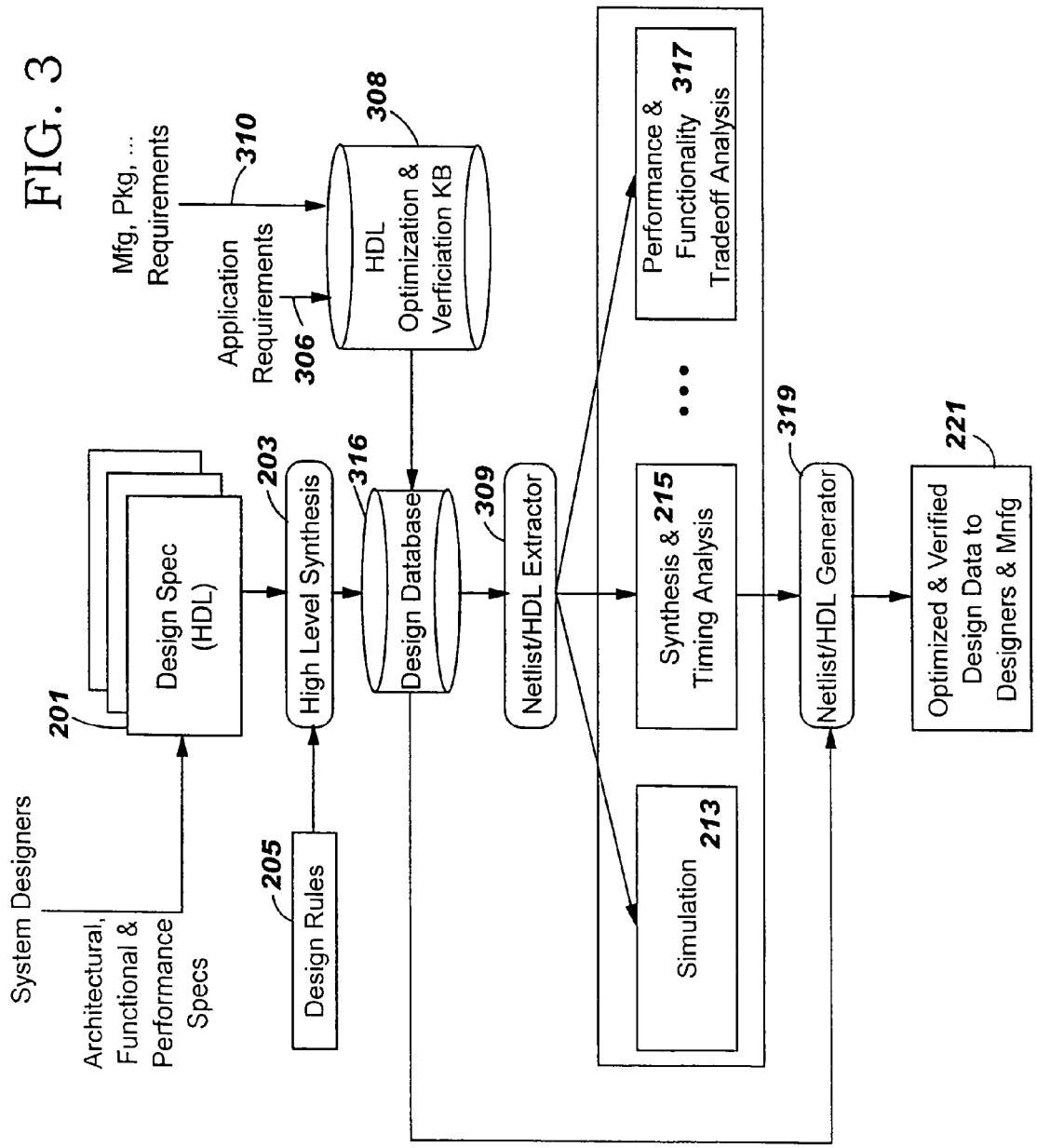
FIG. 3 is a high-level block diagram illustrating an enhanced SoC design methodology utilizing knowledge-based optimization based on requirements provided by end-users and manufacturing.

FIG. 3 illustrates an enhanced SoC design methodology, having similar stages/components with FIG. 2, but which also provides passive collaboration during HDL optimization and verification 308. The methodology utilizes loosely integrated knowledge-based design optimization based on input provided by the end-users, etc. Similarly numbered elements are described above in the description of FIG. 2. The passive collaboration allows some consideration of requirements provided by end-users and the manufacturing design team, such as specific application requirements 306 as well as manufacturing and packaging requirements 310. Also, the passive collaboration data interacts with a design database 316, which receives the results of high level synthesis 203 before being taken through Netlist/HDL extractor 309. Prior to the process that produces optimized and verified design data to the designers and manufacturer 221, the design process is passed through a Netlist/HDL generator 319.

Figure 4:
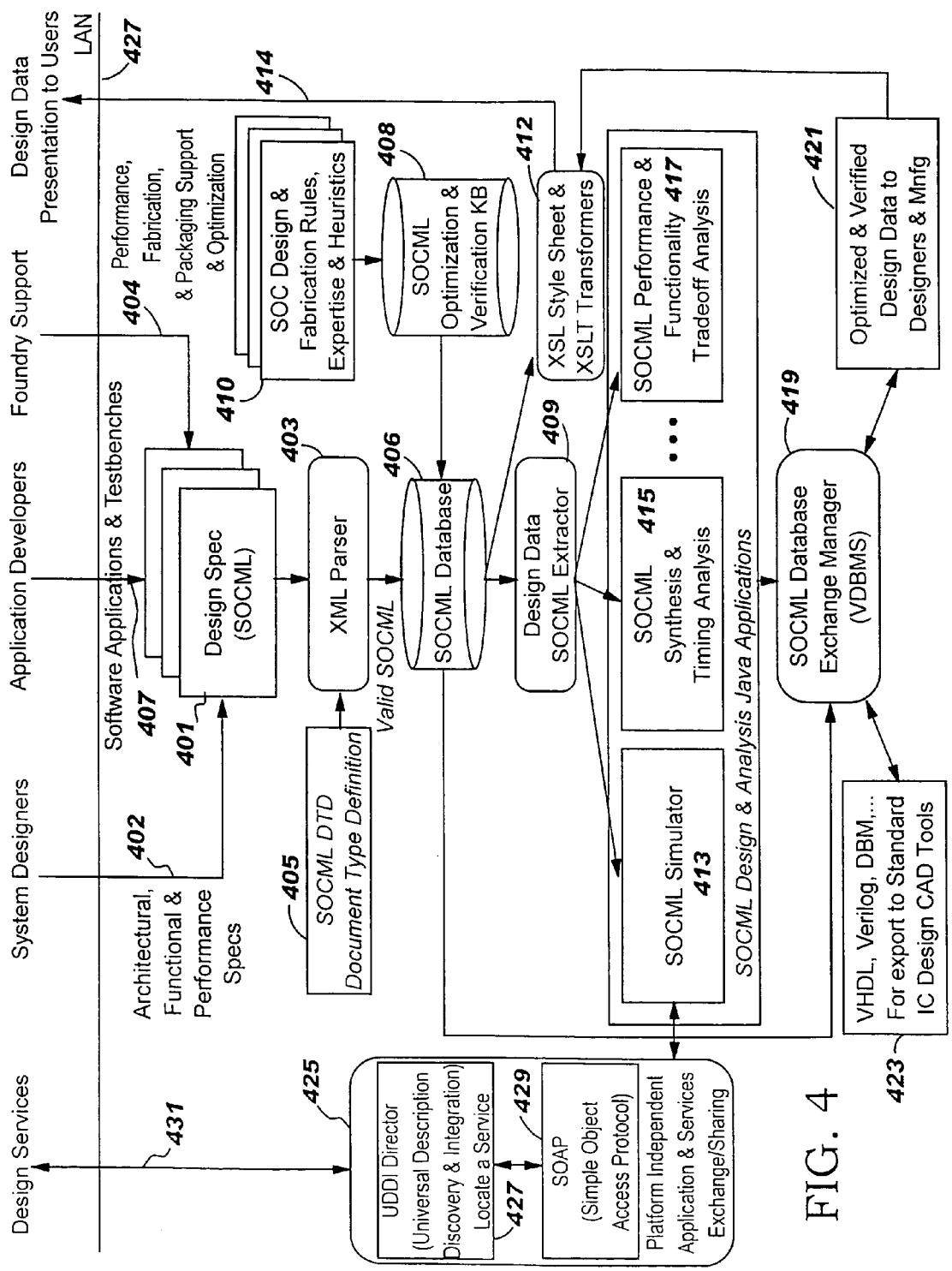
FIG. 4 is a high level block diagram depicting an SoC design methodology with a single, unified access point to all databases and tools on a local network in accordance with a preferred embodiment of the present invention.

The present invention enhances the SoC design methodology by replacing the after-the-fact manual collaboration of separate design teams with a web-based design framework that allows instantaneous collaboration between the various design teams throughout the entire design process. As illustrated in FIG. 4, the entire design process is tracked within a design framework that is available over a LAN 427. The design process utilizes a system-on-a-chip extensible markup language (SOCML) to allow cross-interaction between different design teams utilizing different tools.

An XML-based platform allows exchange of data across the Internet or Intranet and facilitates development of web-based design applications. XML allows the design teams to create SOC-specific smart design documents for exchange across the Web and local or remote processing of the design data by a set of standard Java applications. Thus, common design data and design resources management based on XML are utilized and a common design data and design resources presentation based on XSL are provided. A set of rules is created defining the XML tags that are utilized for the structure, format, and content of design data components that are exchanged. The resulting extended XML definition is called SOCML (System-On-a-Chip Markup Language).

A Document Type Definitions (DTD) is utilized to define SOCML. DTD specifies: (1) What elements may exist in a SOCML document; (2) What attributes the elements may have; (3) What elements can be nested (found inside other elements); (4) What order the elements should be defined in an SOCML; and (5) The XML design files adhering to SOC DTD that constitute SOCML.

Use of the SOCML provides several benefits, including (1) SOCML can enforce certain standards without restricting the exact content; (2) System designers and technology foundries can easily exchange design information based on SOCML and according to its DTD; (3) Each side can develop applications based on the standard SOCML and verify its input/output against the SOCML DTD according to the agreed upon structures independent of the exact content; and (4) The content of each element of an SOCML can be generated by a CAD tool in a specific format as long as the document structure adheres to SOCML. Presentation and formatting of content of SOCML elements in each environment and for each specific design tool is governed by XSL attributes.

FIG. 4 provides a LAN-based SoC design methodology based on proposed architecture utilizing optimization and verification KB 408, as well as providing a mechanism for active SOCML participation of designer, end-users, and manufacturing, SoC design and fabrication rules, expertise and heuristics depicted in block 410.

The layout of FIG. 4 tracks the stages of the SoC design via a software generated/enabled design framework that is supported by a SoC markup language (SOCML). Each design stage is represented by an SOCML functional block e.g., SOCML design specification 401, SOCML database 406, design data SOCML extractor 409, SOCML simulator 413, SOCML synthesis and timing analysis 415, SOCML performance and functionality tradeoff analysis 417 and SOCML database exchange manager 419. Each SOCML block is coded utilizing design and analysis java applications. Additionally, design framework interacts and exchanges data with its applications and services via SOCML. The application and/or service is translated into XML, which acts as a platform-independent wrapper. This translation is governed by the SOCML DTD rules 405, which are applied to SOCML design specification via XML Parser 403.

Input to the design process is received from system designers 402, application developers 407 and manufacturing Engineers 404. Output from the design process is provided to users 414 via XSL style sheets and XSLT transformers 412, which manipulate data from SOCML database 406 or the optimized design data 421. Each design dataset is transformed into a standard format for presentation to users based on the design data XSLT or the user environment XSLT.

In addition to providing all of the various design services, databases, tools, etc., within the SOCML design framework, an additional feature is provided that allows VHDL, verilog, DBM, etc., to be exported to standard IC design CAD tools 423. The design framework facilitates a secure and easy to use environment for sharing design information and also design tools, methodologies, and expertise (peer-to-peer design collaboration).

FIG. 4 also provides functional components that permit the platform independent application and services exchange and sharing as shown in block 425. Specifically, an XML wrapped data, service, and application is produced and delivered to the client/user via design services 431. This involves utilization of universal description discovery and integration (UDDI) director 427, which locates a requested service and makes the service available to the end user via 427 and Simple Object Access Protocol (SOAP) 429.

SOAP 429 is a protocol for exchange of information in a decentralized and distributed environment. SOAP 429 is an XML protocol that consists of three parts: (1) an envelope that defines a framework for describing what is in a message and how to process it; (2) a set of encoding rules for expressing instances of application-defined datatypes; and (3) a convention for representing remote procedure calls and responses.

Figure 5:
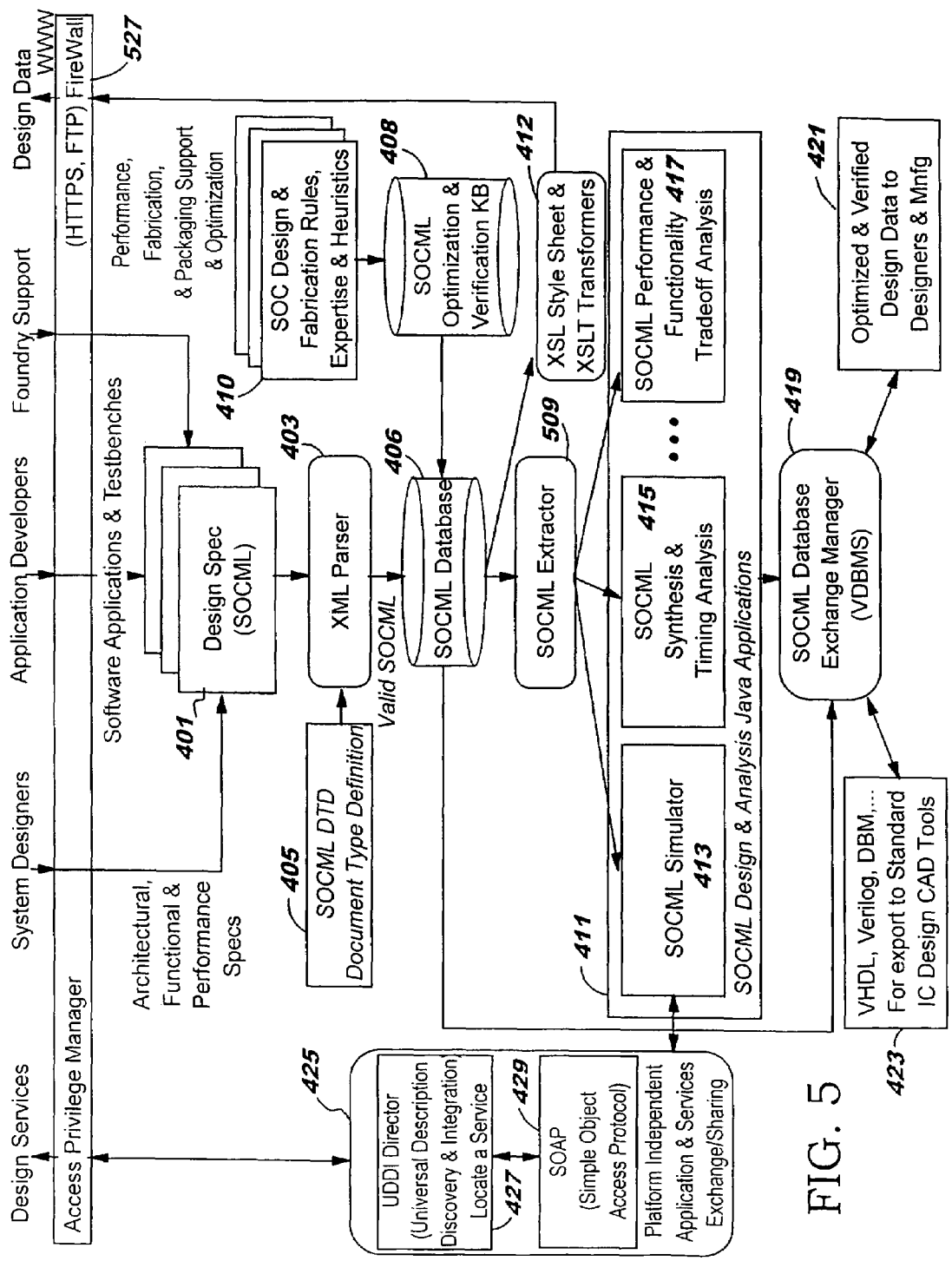
FIG. 5 is a high-level block diagram, similar to FIG. 4, in which the single, unified access point is provided via an Extranet or the Internet and user access control is provided via Access_Privilege_Manager in accordance with another preferred embodiment of the present invention.

FIG. 5 illustrates a similar design framework as FIG. 4; however, the network of FIG. 5 is uniquely different in that access to the design framework is via an Extranet or the Internet rather than a local network (LAN). Further, access to the design framework is controlled by an Access_Privilege_Manager 527 that provides active participation and collaboration to selected personnel or groups. As with FIG. 4, SOAP is utilized to pass design information and services to users across platforms and through firewalls. In the preferred embodiment, the design framework utilizes XML-based architecture that enables data exchange and transportation across the Internet. The XML architecture is modified to create the SOCML functional blocks.

The Internet-enabled design framework comprises a suite of tools that communicate across the Internet to facilitate engineering and design collaboration, easily locating the required design information from third-party sources, and shared access to design data from anywhere in the world. Thus, for example, the local CAD tools of a design team are provided through a user interface connected to the design framework that maintains a framework accessible CAD tool, and the resulting CAD generated design data placed immediately on a database within the design framework.

Access_Privilege_Manager 527 provides a single, unified access point to all databases (i.e., design data) and all tools utilized by the various design teams and design expertise. Access_Privilege_Manager 527 also maintains a control list of users, their user identifications (IDs), and passwords. Further, Access_Privilege Manager 527 maintains the level of authority for each user, the group the user belongs to, the group authority, and access authorization for one or more project administrator(s) who has authority to add/remove users. The information maintained by access privilege manger is stored in an Access_Privilege Database, that is controlled by the project administrator(s).

The Access_Privilege_Manager provides a two tier security abstraction; role-based access and design object type enforcement. Each user profile includes an associated role. Access to processes and design objects are granted if the process object's scope includes (or supports) the requestor's role. Each user or process can only access design objects that have a type included in the user or process Access_Type_List.

In addition to the internal access management, Access_Privilege_Manager can utilize biometric security options for granting user access and verifying user identity. Biometric security device such as "facial scans", "eye scan", "fingerprints", and "voice authentication", can be utilized.

The invention taps into the potential of the Internet to allow access from any geographical location and also taps into the functional features of XML to aid in the collaborative SoC design process. Design iterations are reduced through enhanced communication and collaboration, and redundant effort is eliminated through design reuse and better library-management practices. The invention thus provides a huge gain in productivity. Additionally, as the Internet enables improved integration for purchasing and manufacturing, SoC cost decreases.

From the design team perspective, any standard browser may be utilized to access the design framework, and the World Wide Web (Internet) essentially acts as a common user interface by providing a common ground for the distribution and management of design information. Utilization of the Internet also allows information regarding the SoC design to be made available to a multitude of people or design teams in a variety of different disciplines, i.e., not just the designers. Thus, package designers, system software designers, marketing and project managers, etc., are able to make better decisions and better planning based on actual design data, progress and status. The invention thus provides a design and development environment that is consistent with extension of the Internet as an ideal medium for the design, marketing, sale, distribution and support of ICs, ASICs, and SoCs.

In the preferred embodiment, the following features are provided by the Internet-based SoC design framework: (1) The proprietary design information can be shared and exchanged across multiple locations; (2) Each team can define certain format and content requirements for the required deliverables; (3) The deliveries (design drops) can be automatically checked and verified for correctness, completeness, construction and content; (4) The requirements of (3) can be automatically verified on the sender's side based on rules defined and agreed upon without any need for any inspection or intervention; (5) Each team involved in the design process will perform certain tasks on specific design components and therefore will have specific access and usage authorization; (6) Design components maintain a complete self-contained access and utilization log (i.e., who did what, utilizing which tool, when, and why, etc.); (7) Each design team can define (and sign-up for) specific design tasks that their members are responsible for and decide which tasks will be performed on the client-side and which ones on the server-side; and (8) Each design team defines what part of their data can be viewed by who, what tool, and for what purposes. This provides a secure environment for access management and sharing of customer proprietary data among design teams, which is required for optimized design.

XML-Based Collaborative Design Framework

The invention comprises various design automation tools utilized in SoC design and provides the features that enable these tools to be accessed and utilized effectively via the Internet. An analysis of the applications involved and the steps entailed in the design flow is first completed. Design tasks, which are less processing-dependent (such as layout), can be efficiently accomplished remotely via the Internet, while simulation or routing, which is very processing intensive and better suited to be performed locally. The proposed design framework is architected such that it provides local (i.e., client-side) processing, remote (i.e., design center-side or server-side) processing as well as peer-to-peer (P-to-P) processing. In a preferred embodiment, the online knowledge-base estimates the processing time/resources needed and makes recommendation on the mode of design (i.e., local, remote, or P-to-P).

Another very important aspect of the design environment that is provided by the invention is the immediate sharing or dissemination of the design data generated, and design attributes with other designers and design sites, whether the design task is done locally or remotely. The invention provides a mechanism by which various design data formats are encapsulated and delivered to other designers in a secure and easy to use environment. In the preferred embodiment, this aspect of the invention is handled utilizing the functionality of XML, and the various data manipulation functions utilize XML to structure information extracted from the database so that the data can be distributed and published more easily.

Data integration solutions utilize XML to automate the exchange of data. In general, with an integration solution, XML serves as an interface layer or wrapper for data being passed between data sources, making it possible for a wide variety of applications, legacy systems, and databases to exchange information. Virtual Database Management Systems (VDBMS) take data from many different sources and create a single relational database interface to all the data sources. Afterwards, XML is utilized to map the various structures used by the data sources to a common syntax for easy access. Finally, a set of publishing XSLT rules (a set of transformation rules based on eXtensible Style Sheet Language (XSL)) is provided to extract information on demand and publish the information (i.e., to present the information to the user via Internet). The resulting environment is an XML-based information repository that is able to update itself whenever the related data sources change. In the preferred embodiment, SOCML Data Manager and the associated data exchange and data publishing facilities depicted in FIGS. 4, 5, and 6A, serve as such a VDBMS.

Refining a traditional database query requires a complete round-trip session from the browser through the server to the database and back again. Utilizing XML, the query results are extracted from the database and may be further refined on the client device. In one embodiment, utilization of XML requires a special application or a browser plug-in such as IE4's XML parser; however, the preferred embodiment is implemented utilizing one of the latest versions of browser applications which provide full XML support.

One very important advantage of XML as utilized in this invention is XML's search-enhanced features and data architecture. Unlike, HTML-based search tools, which utilize keywords and text, XML-based search tools use data structure and meta data, thus enabling easier finding of information. In operation, the XML search tool checks a query against a SoC or Design's DTD that contains tags matching what is being looked for (e.g., content, intent, and use). Thus, the XML-based search tool provides a more efficient and accurate search capability and returns information containing exactly what the design team member is looking for. The provided information is formatted in its own familiar industry format based on its XSLT style sheet transformation rules. The same design data can be mapped to different XSLT for different users (i.e., different languages or different industry standard formats).

Design Task Management and Tracking

Figure 6A:
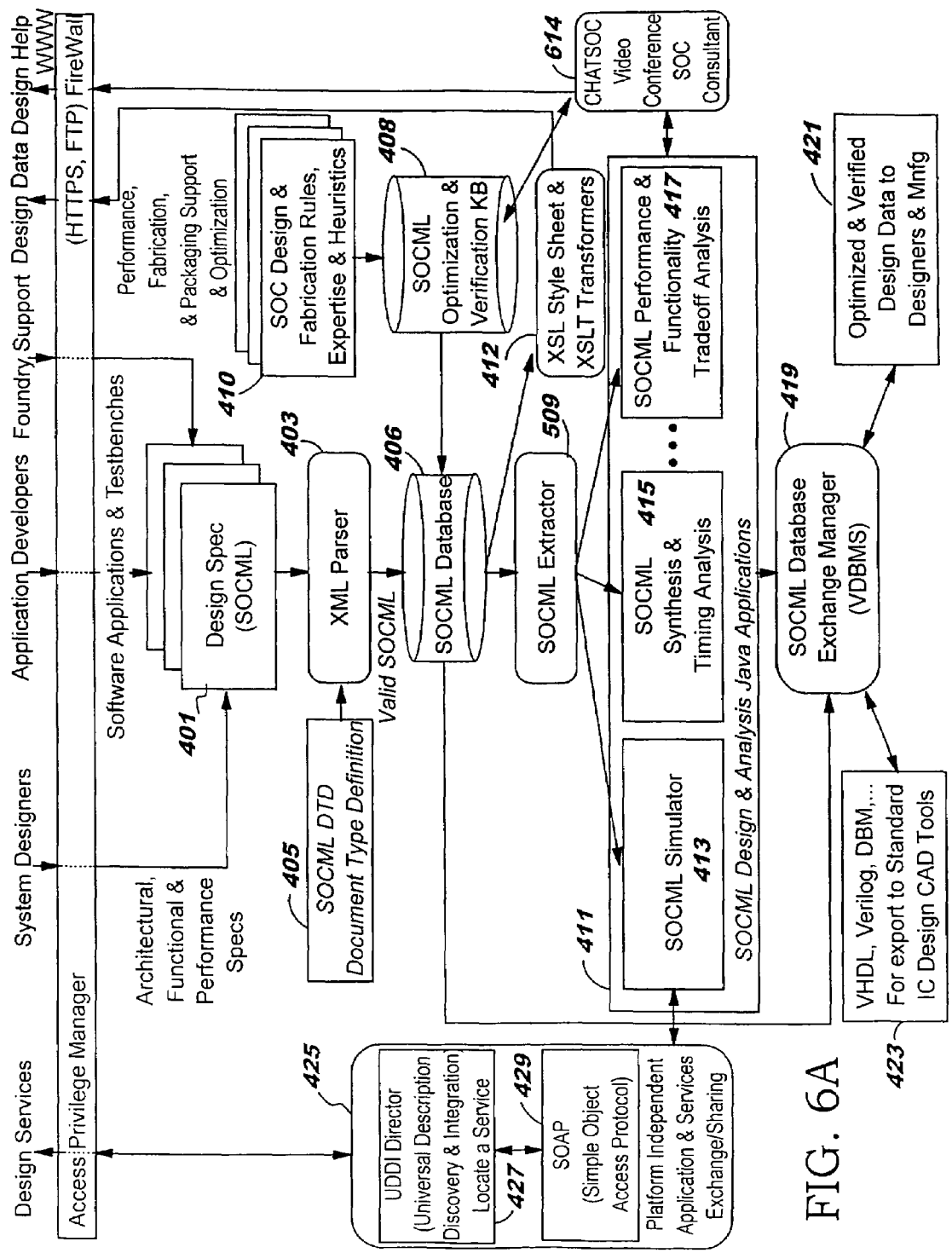
FIG. 6A is a high-level block diagram illustrating a combination of local network and Extranet and/or Intranet access to said design environment with a CHATSOC feature in accordance with another preferred embodiment of the present invention.

FIG. 6A illustrates a design framework with similar functional components to those of FIG. 5 with an additional component, Customer Help At Terminal for SOC, (CHATSOC) 614, by which interactive consultation such as a video conference SoC consultant is provided for active collaboration and participation among design teams to yield better design optimization.

Figure 6B:
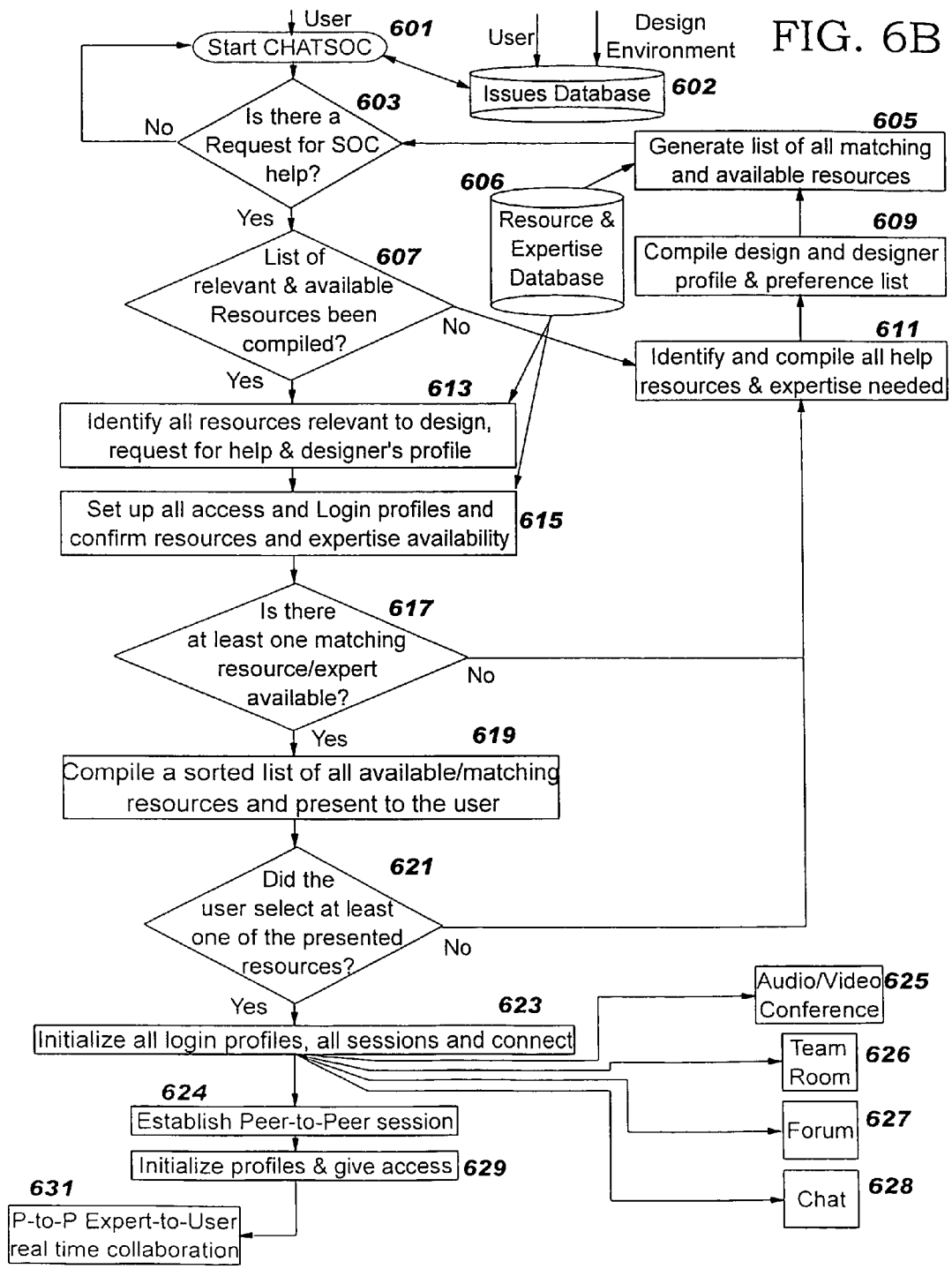
FIG. 6B is a high-level functional flow chart depicting operations and features of CHATSOC provided in FIG. 6A in accordance with another preferred embodiment of the present invention.

FIG. 6B provides an example implementation of CHATSOC design. CHATSOC provides a forum, a chat, a whiteboard, a conferencing mechanism, as well as a peer-to-peer point of service. CHATSOC provides service and access to relevant design forums, chat rooms, and design team rooms. Additionally, CHATSOC manages the sign up and connection to these services making it transparent to the user.

CHATSOC also serves as a broker for locating and routing a user with an outstanding Help request to an available registered expert. Once the expertise required has been identified, the user (his/her CHATSOC session) is forwarded to experts, who are certified and/or qualified for that field of expertise. Once at least one expert has acknowledged and accepted the outstanding request for help, a peer-to-peer connection is provided between the user and expert, where the expert is granted a guest account in the corresponding design environment. The expert will have access to all user data and tools (unless restricted by user).

The functional block diagram of FIG. 6B shows the process of identifying expertise required for an outstanding Help request on an open design issue. CHATSOC is started as shown at block 601, and a determination made at block 603, whether a request for assistance has been received (from a user). When a request has been received, the determination is made at block 607 whether a list of all available or relevant resources has been compiled. If no list has been compiled, HELP resources needed are compiled as shown at block 611. Then the design and designer profiles are compiled as depicted at block 609. Following, a list of all matching or available resources are generated as shown at block 605 using the up-to-date resource and expertise database 606.

Returning to block 607, when a list of available or relevant resources has been compiled, the resources relevant to the design or request for help and the designer are identified at block 613. To complete this step, the expertise is analyzed against "Resource and Expertise database" 606 and all possible matches are identified. The relevant matches are then presented to the user who can select his/her preferred medium to receive help. CHATSOC then establishes the required communications and access channels and monitors the process in case additional help is needed, or to close the case, or mark it as in_progress or more_help_needed, etc.

As shown at block 615, the access information, including login profiles, are set up and the corresponding system and resource availability is verified. Following, a next determination is made at block 617 whether there is at least one matching resource available. If there is a matching resource available, then a sorted list is compiled and presented to the user as shown at block 619. A next determination is made at block 621 whether the user has selected at least one resource. If the user has selected at least one resource, the resource is initialized or connected as shown at block 623. The connection may be via P-to-P 624, audio/video conference 625, team room 626, forum 627, or chat 628. If P-to-P 624 is established, specific profiles are initialized or setup and access provided as shown at block 629. This enables P-to-P expert collaboration as indicated at block 631.

Figure 7A:
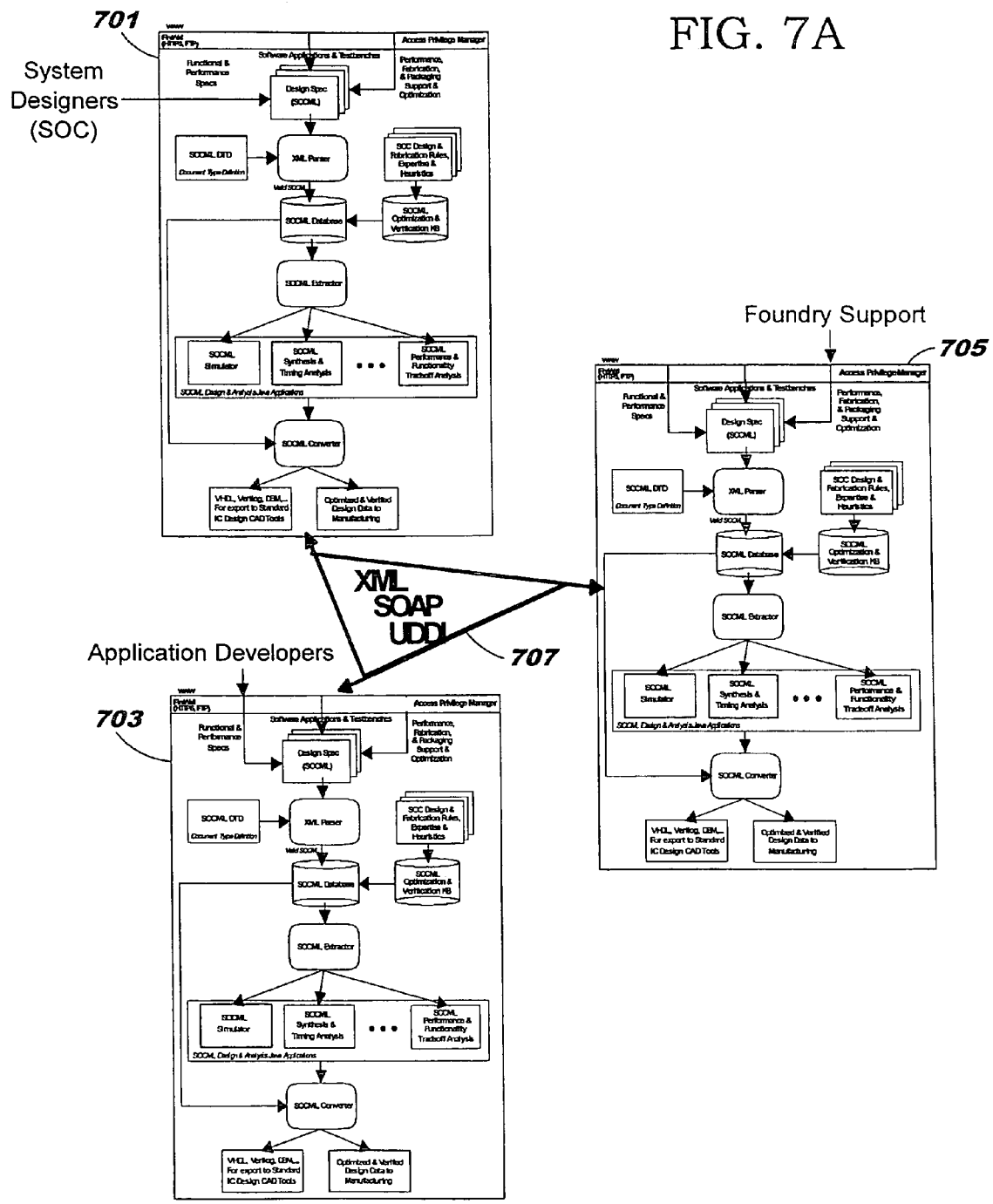
FIGS. 7A and 7B are high level block diagrams depicting two of the possible operating modes and the interconnection between various design teams via XML-based web connection in accordance with a preferred implementation of the present invention.

FIG. 7A illustrates yet another one of the possible operating modes of the collaborative design environment. As shown, the design framework allows partitioning of tasks across multiple sites and/or design groups. Each group 701, 703, and 705 provides services and exchange associated results via XML-based containers 707, and associated SOAP and UDDI as described above. Each group 701, 703, and 705 corresponds to a design team or team member, who is provided some amounts of autonomy (i.e., local ownership of one or more design task). The local ownership capability allows application developers 703, for example, to concentrate on application development tasks and not to have to share the detail of their application with system designers 701 or manufacturing 705. Each site may operate as a local network (LAN) design environment or via an Extranet or via the Internet. Design tools are utilized and managed locally. Expertise and proprietary data stays local and only related design files are exchanged via the secure XML containers. Within each site, design data may be shared in its original format or via XML containers. The illustrated embodiment also supports out-sourcing of tasks to third party vendors.

Figure 8:
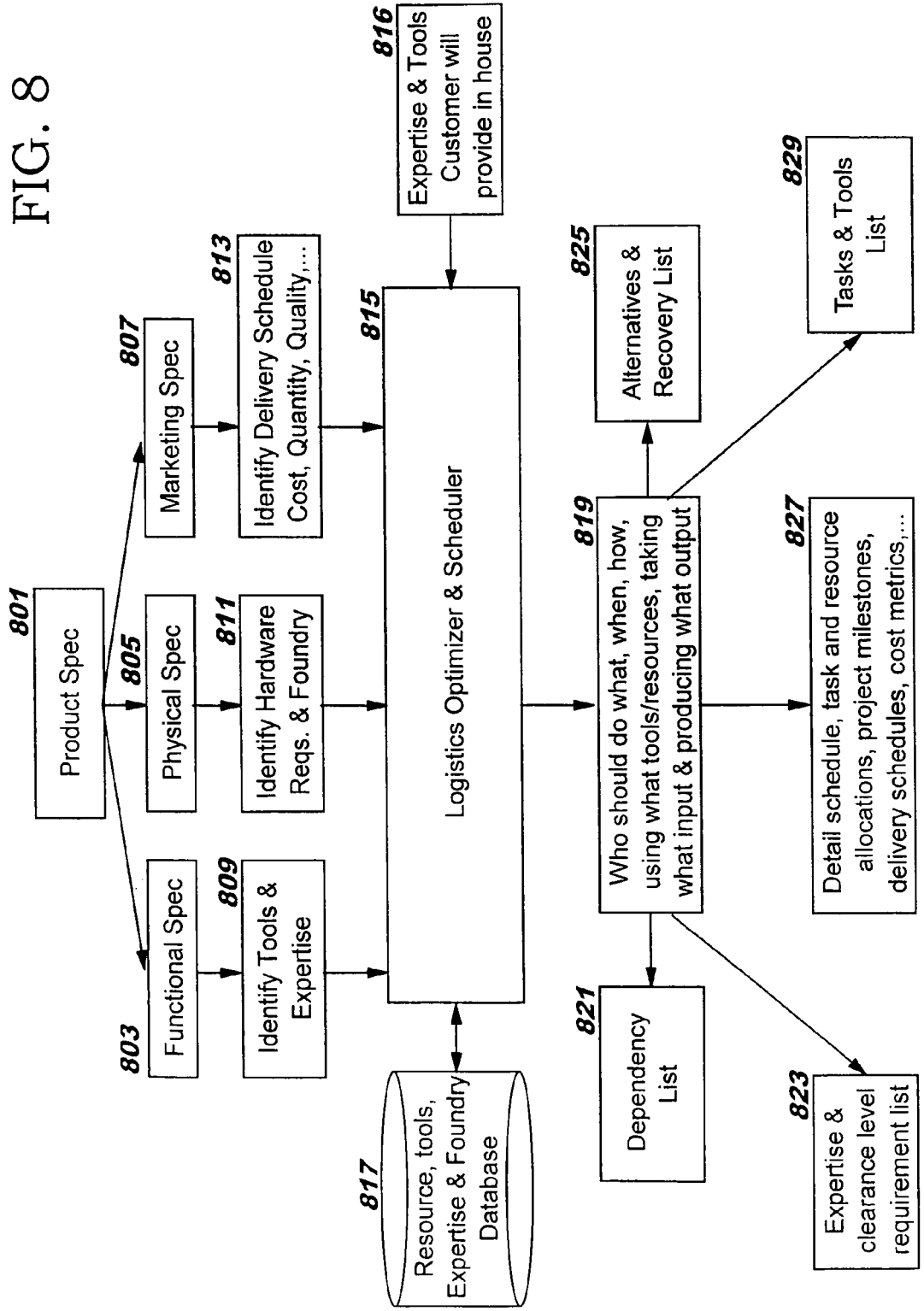
FIG. 8 is a high level logical design stage diagram depicting the process of dividing tasks among the various groups within a design environment for a SoC in accordance with one implementation of the present invention.

Each design situation is managed according to the design size, design schedules, and other design attributes as shown in FIG. 8. In the preferred embodiment, because some SoC design tasks are very processing-intensive, these tasks are performed on the fastest machines available in the design environment. For example, simulation, which is typically very processing-intensive, is performed on the fastest available machine in the design environment whether local or remote, and the result of simulation is streamed to the design database for broadcast to and access by other team members or interested parties via the XML transportation/transformation mechanism. Such design task assignments are made according to FIG. 8.

Figure 7B:
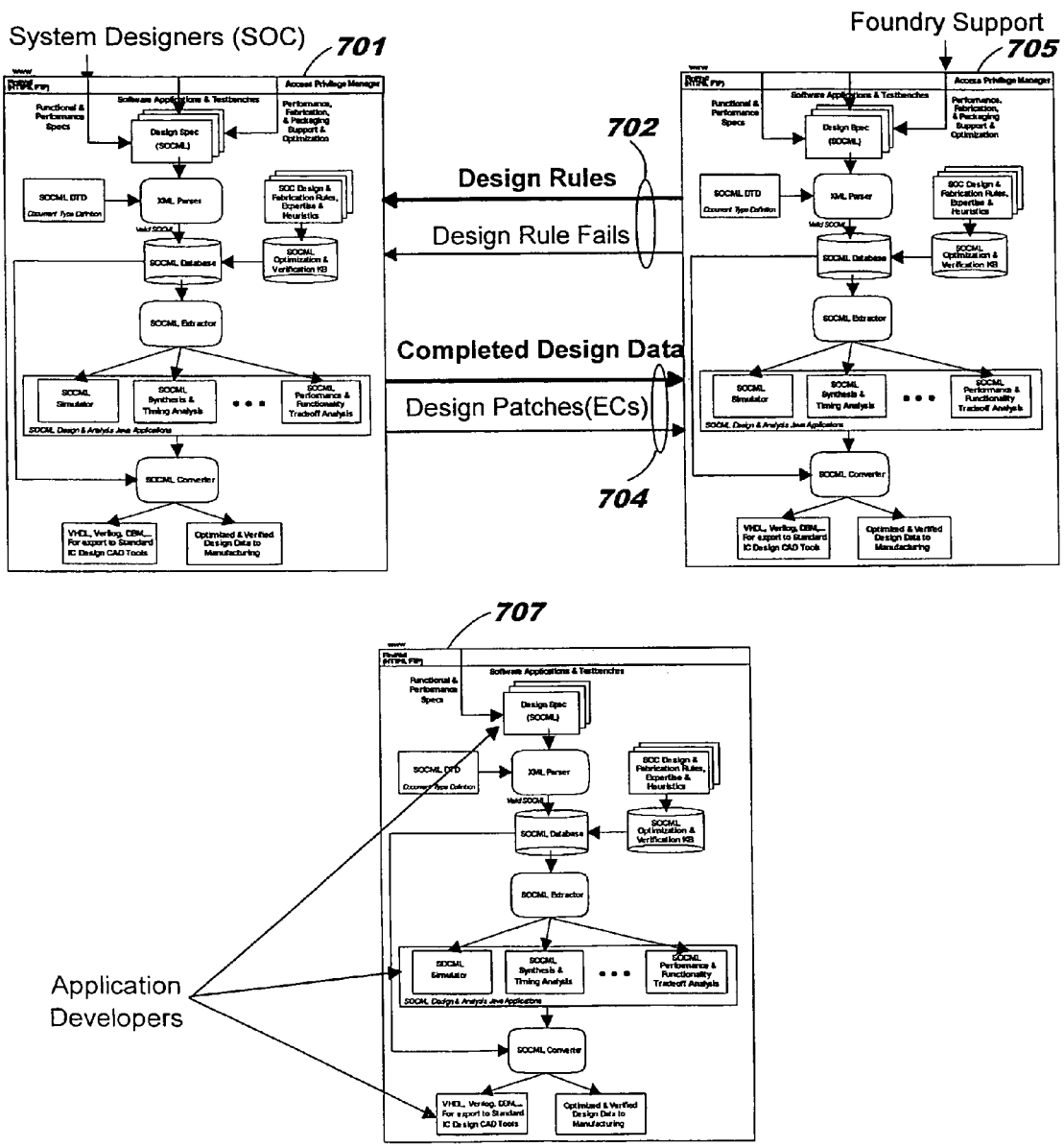

FIG. 7B provides another embodiment in which the system designers 701 interact directly with the manufacturing (foundry support) 705 and share data across sites, including design rules 702 and completed design data 704. The application developers 707 work independent of the other groups/sites. Directional arrows indicate at which stages of the design process the application developers 707 may interact with the other sites. It is understood that each site is able to utilize the present system for independent local design management and collaboration.

FIG. 8 illustrates a design management flow chart for management and assignment of labor (or design tasks) amongst various design groups according to one embodiment of the invention. The product specification 801 is expanded into functional specification 803, physical specification 805, and marketing specification 807. For the functional specification 803, the required tools and expertise are then identified at block 809. Foundry and hardware limits or requirements are identified at block 811 for the physical specification 805, and schedule, costs, quality and related issues are identified at block 813 for marketing specification 807.

Following, the identified issues are provided to a logistic optimizer or scheduler 815, which is also provided with the database of expertise, tools and other information shown at block 817 and available in-house expertise and tools 816. The logistic optimizer/scheduler 815 then generates a schedule that indicates who should do what tasks, at what time, utilizing what tools, and what inputs to produce what outputs as illustrated at block 819. As a spin off from this task list is generated a dependency list 821, a task list of expertise and clearance levels required 823, alternatives and recovery lists 825, a detailed schedule with resource requirements, project milestones, etc., 827 and a list of all tasks and tools 829 required for the product.

The invention provides measurable savings in time and cost, and ensures a quality end product in comparison to present SoC design methods. For example, a designer may be working on a design team of 10 designers, with each designer located in a different location around the world. Ordinarily, with current design methods, one designer may perform the simulation task and then document the results before forwarding it to the rest of the team. This process may take a few hours, or for a more complex simulation, a few days. Irrespective of the actual length of time required to complete the simulation, the work done by the design team is unable to proceed past simulation until the simulation is completed and the results of the simulation sent to the rest of the design team.

With the present invention, the entire design team has access to all design tools and design data via Internet or intranet (wired and wireless), (now extended to include a browser application). With the same simulation task, one member of the design team may be designated to perform the simulation at his/her location. Since all of the design team members are linked via the Internet or an intranet, each designer is able to see and work on the simulation results as they are being generated, i.e., in real time.

Thus, all members of the design team have access to the current state of the design and the continuously updated design repository, and changes made by any one member is instantly and simultaneously seen by all of the members. In this manner, the design flow does not grind to a halt while one designer finishes a particular task, such as the simulation task.

It is important to note that while the present invention has been described in the context of a fully functional data processing system, those skilled in the art will appreciate that certain elements of the method of the present invention are capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A computer-based design framework for collaborative design of a product comprising:
    a virtual database management system, which includes a processor and which receives data from a plurality of sources and creates a single database interface to said sources, wherein each of said plurality of sources represents a design team with one or more design team members provided access to said virtual database management system via a network, wherein the framework enables completion of multiple design tasks across architectural, functional and performance hierarchies of a complex design;
    program code associated with said virtual database management system for mapping various informational structures utilized by said sources to a common syntax, wherein the common syntax is an eXtensible Markup Language (XML);
    program code for providing platform-independent application and services exchange utilizing XML wrapped data, service, and application that is delivered to a client;
    additional logic associated with said virtual database management system that provides a set of publishing rules for extracting information on demand and publishing said extracted information in a format recognized by a requestor of said information;
    an Access Privilege Manager implemented with program code that: (a) monitors and controls access to said design framework by design teams, design team members, and other selected personnel, groups, and design automation tools; (b) maintains a control list of one or more authorization parameters from among users, user identification and passwords, a level of authorization for each user and group, a group to which each user belongs, specific group authority for access, and access authorization for one or more project administrators, wherein access to processes and designs within said framework is only granted to a user whose authorization and registered role supports said access; and (c) supports biometric security features for user-access to said framework; and
    a customer help at terminal (CHATSOC) function that provides an online collaboration and conferencing between design teams, design team members, and other personnel, wherein CHATSOC further provides outside assistance to a design team and design team member, wherein said outside assistance is selected from a compiled database of outside assistance personnel in response to a request for assistance by said design team or design team member, wherein a peer-to-peer connection is dynamically established when an outside assistance personnel accepts and acknowledges the request.

2. The computer-based design framework of claim 1, wherein said program code for providing platform independent application and services exchange includes a universal description discovery and integration (UDDI) director for locating services and exchange data and service according to simple object access protocol (SOAP).

3. The computer-based design framework of claim 2, wherein said network is a local area network and connection to said framework by each of said design team members is provided via a LAN-connected terminal.

4. The design framework of claim 2, wherein:
    said network is the Internet;
    said virtual database management system is hosted on a server on the Internet; and
    wherein access to said design framework is provided via a web browser of a computer system that is connected to the Internet and is utilized by said design team members.

5. The design framework of claim 1, wherein:
    each design team may be provided local ownership of a particular task within the design, wherein said local ownership allows for a determination of a level of corporation with other design teams and a level of information sharing desired;
    wherein said design is divided into a plurality of tasks, and said framework further includes program code for:
        tracking each of said plurality of tasks and tools available within a design environment;
        matching tasks to specific tools, wherein processing-intensive tasks are assigned to fastest processors and applications available in said design environment; and
        matching task to a team and team members with a required expertise.

6. The method of claim 1, wherein said product is a system-on-a chip (SOC), further comprising enabling said collaborative features of said design framework utilizing a system on a chip extensible markup language (SOCML) that allows cross-interaction between different design teams utilizing different tools.

* * * * *